(12) United States Patent
Lin

(10) Patent No.: US 9,110,548 B2
(45) Date of Patent: Aug. 18, 2015

(54) TOUCH MODULE

(71) Applicant: Chih-Chung Lin, Taipei (TW)

(72) Inventor: Chih-Chung Lin, Taipei (TW)

( * ) Notice: Subject to any disclaimer, the term of this patent is extended or adjusted under 35 U.S.C. 154(b) by 110 days.

(21) Appl. No.: 13/760,059

(22) Filed: Feb. 6, 2013

(65) Prior Publication Data

US 2014/0166451 A1    Jun. 19, 2014

(30) Foreign Application Priority Data

Dec. 19, 2012 (TW) .............................. 101148211 A

(51) Int. Cl.
*G06F 3/045* (2006.01)
*G06F 3/044* (2006.01)

(52) U.S. Cl.
CPC ...... *G06F 3/044* (2013.01); *G06F 2203/04107* (2013.01)

(58) Field of Classification Search
CPC ........ G06F 3/044; G06F 3/045; H03K 17/975
See application file for complete search history.

(56) References Cited

U.S. PATENT DOCUMENTS

2011/0090159 A1* 4/2011 Kurashima .................... 345/173
2013/0038571 A1* 2/2013 Ho et al. ....................... 345/174

\* cited by examiner

*Primary Examiner* — Edwin A. Leon
*Assistant Examiner* — Ahmed Saeed
(74) *Attorney, Agent, or Firm* — C. G. Mersereau; Nikolai & Mersereau, P.A.

(57) ABSTRACT

A touch module includes a transparent substrate, a shield layer, a touch electrode layer, a transparent insulation layer and a lead layer. The shield layer is coated on the transparent substrate. The touch electrode layer is coated on both the transparent substrate and the shield layer. The transparent insulation layer is disposed on the touch electrode layer and formed with at least one through hole. The lead layer is disposed on the transparent insulation layer and formed with a conduction section positioned in the through hole in electrical connection with the touch electrode layer. Therefore, the lead layer can directly electrically connect with the touch electrode layer through the through hole of the transparent insulation layer. Accordingly, the cost for the optical mask design and the lithographic and etching processes can be saved and the problem that the transparent substrates often fail to fully attach is eliminated.

5 Claims, 4 Drawing Sheets

TOUCH MODULE

This application claims the priority benefit of Taiwan patent application number 101148211 filed on Dec. 19, 2012.

BACKGROUND OF THE INVENTION

1. Field of the Invention

The present invention relates generally to a touch module, and more particularly to a touch module in which the wiring structure is changed.

2. Description of the Related Art

Along with the rapid development of information techniques and communication networks, various personal electronic information products have been more and more popularly used. To go with the tide, various touch panels have bee rapidly developed and applied to the electronic products. According to the sensing principle, the current touch panels can be mainly classified into resistive touch panels, capacitive touch panels, electromagnetic touch panels and optical touch panels. The capacitive touch panel structures have the advantages of dustproof, fireproof and high-resolution performances and are thus widely used. The working principle of the capacitive touch panel is that the touch point position is identified according to the change of capacitance. When a conductive touch article (such as a finger) gets close to the touch panel, the capacitance between the electrodes changes to identify the coordinates of the touch point.

The capacitive touch panels have gradually become the mainstream of touch techniques and are widely applied to various electronic information products nowadays, such as cellular phones, tablets, walkmans, handheld electronic devices, displays and monitors. The capacitive touch panel can detect the capacitance change caused by the weak current of human body to identify the positions of the finger and touch selection conditions so as to achieve the object of touch control.

Please refer to FIG. 1, which is a sectional view of a conventional capacitive touch panel. The conventional capacitive touch panel includes a first transparent substrate 10 and a second transparent substrate 11. One side of the first transparent substrate 10 has a touch sensing circuit layer 12 and a lead layer 13 in electrical connection with the touch sensing circuit layer 12. The touch sensing circuit layer 12 is a single-layer touch sensing circuit. The other side of the lead layer 13 has an insulation layer 14 partially covering the lead layer 13. A conductive glue layer 15 is disposed on an exposed section of the lead layer 13. A soft printed circuit board 16 is disposed on the other side of the conductive glue layer 15. The soft printed circuit board 16 is electrically connected to the lead layer 13 through the conductive glue layer 15. An optical glue layer 17 is disposed on the other side of the touch sensing circuit layer 12 distal from the first transparent substrate 10 and the other side of the insulation layer 14 distal from the first transparent substrate 10. The second transparent substrate 12 is attached to the optical glue layer 17. The other side of the second transparent substrate 12 distal from the optical glue layer 17 serves as the touch face of the capacitive touch panel. Also, the second transparent substrate 12 serves to protect the touch sensing circuit layer 12, the lead layer 13 and the conductive glue layer 15.

The projective capacitive touch panel is generally divided into a display section and a peripheral section around the display section. The touch sensing circuit layer 12 is mainly positioned in the display section for generating a touch sensing signal. The lead layer 13 and the conductive glue layer 15 are positioned in the peripheral section for transmitting the touch sensing signal to a signal processor for calculating the coordinates of the touch position.

The lead layer 13 is wired in the peripheral section to connect with the touch sensing circuit layer in the display section. When wired, it is necessary to bridge the lead layer 13 to respectively connect with the corresponding touch sensing circuit layer 12. Therefore, it is necessary to use optical mask and perform lithography and etching processes to the lead layer 13 for bridging the lead layer 13 corresponding to the touch sensing circuit layer 12. The cost for the optical mask and the lithographic and etching equipment is quite high so that the total manufacturing cost is inevitably increased. Moreover, the developer and etching liquid used in the lithography and etching processes are both chemical solutions harmful to human health. Therefore, the developer and etching liquid not only seriously threaten the health of the workers in the working site, but also lead to serious pollution of the ecological environment. In addition, it is necessary to use the optical glue layer 17 to adhere the first and second transparent substrates 10, 11 to each other. In the adhesion process, the first and second transparent substrates 10, 11 are likely to displace or fail to fully attach to each other. This will cause defective products. According to the above, the conventional touch panel has the following shortcomings:

1. The manufacturing cost is high.
2. The ratio of defective products is high.

SUMMARY OF THE INVENTION

It is therefore a primary object of the present invention to provide a touch module, which is manufactured without optical mask and lithographic and etching process so that the cost for the optical mask design and the lithographic and etching process is saved to lower the manufacturing cost.

It is a further object of the present invention to provide a touch module, which is manufactured without using optical glue layer to adhere the transparent substrates to each other. Therefore, the problem existing in the conventional touch panel that the transparent substrates often fail to fully attach to each other is eliminated. Therefore, the ratio of good products is increased.

To achieve the above and other objects, the touch module of the present invention includes a transparent substrate, a shield layer, a touch electrode layer, a transparent insulation layer and a lead layer. The transparent substrate has a first side and a second side opposite to the first side. The shield layer is coated on an edge of the second side of the transparent substrate. The touch electrode layer is disposed on the second side of the transparent substrate and coated on the other side of the shield layer, which side is distal from the transparent substrate. The transparent insulation layer is disposed on the other side of the touch electrode layer, which side is distal from the shield layer. The transparent insulation layer is formed with at least one through hole on the touch electrode layer. The lead layer is disposed on the other side of the transparent insulation layer, which side is distal from the touch electrode layer. The lead layer is formed with a conduction section positioned in the through hole in electrical connection with the touch electrode layer. Accordingly, the lead layer can directly electrically connect with the touch electrode layer through the through hole of the transparent insulation layer. In this case, the cost for the optical mask design and the lithographic and etching processes can be saved. Moreover, the problem existing in the conventional touch panel that the first and second transparent substrates often fail to fully attach to each other is eliminated. Therefore, the ratio of defective products is lowered.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
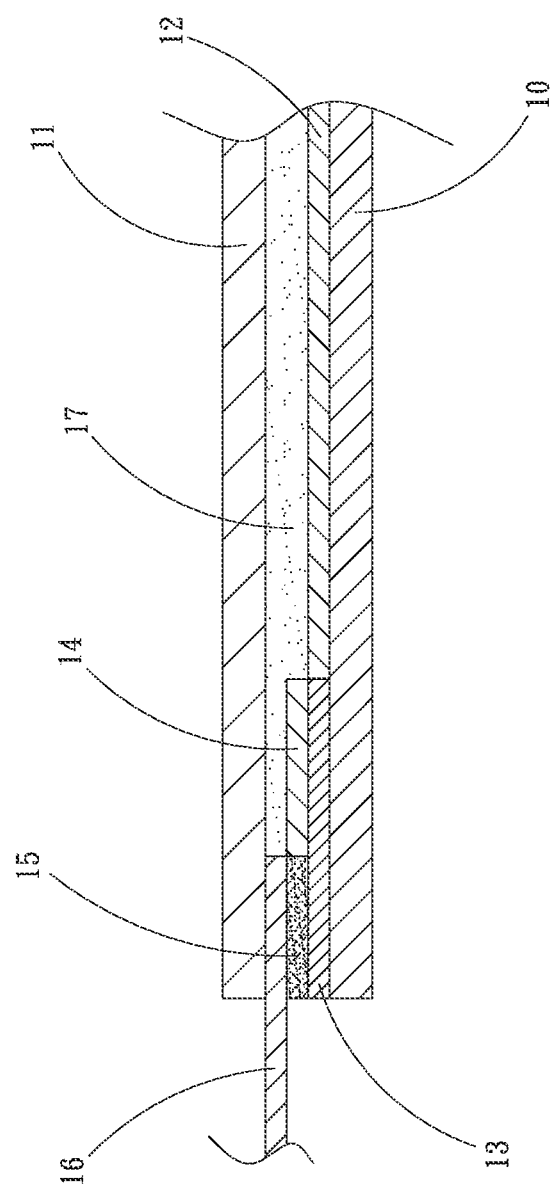
FIG. 1 is a sectional view of a conventional capacitive touch panel.
Figure 2:
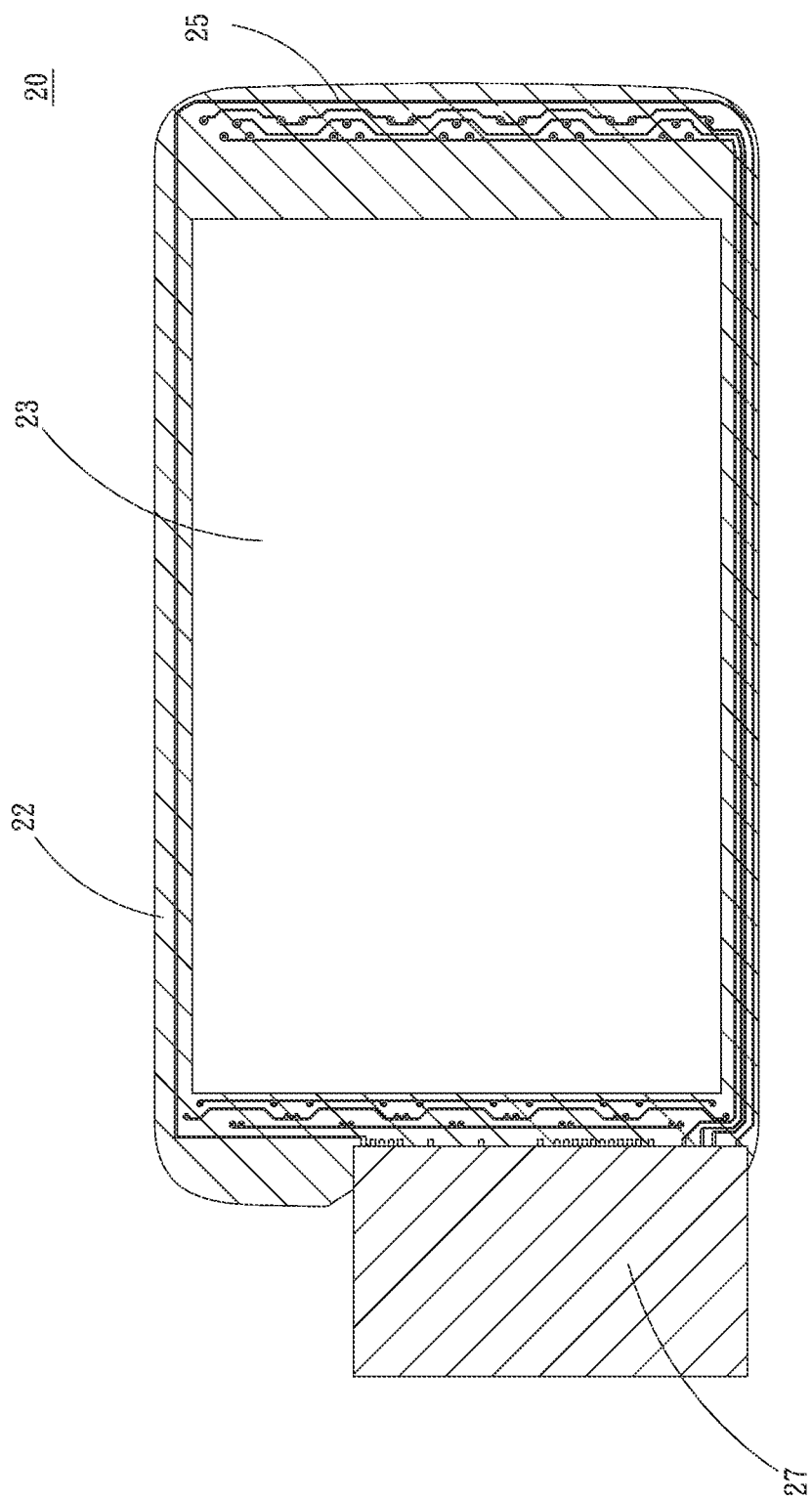
FIG. 2 is a plane assembled view of a first embodiment of the present invention.
Figure 3:
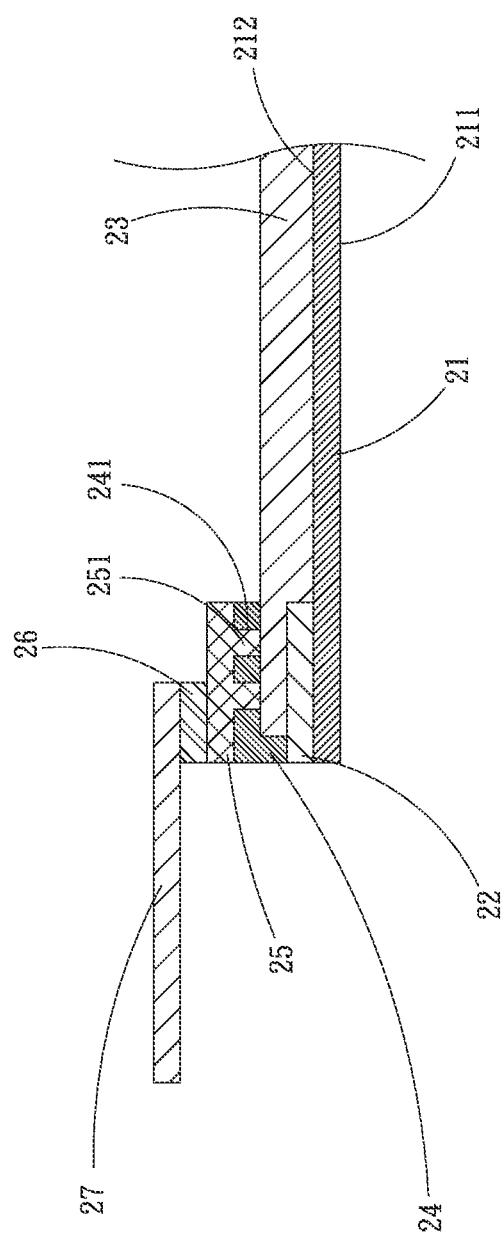
FIG. 3 is a sectional assembled view of the first embodiment of the present invention.

Please refer to FIGS. 2 and 3. FIG. 2 is a plane assembled view of a first embodiment of the present invention. FIG. 3 is a sectional assembled view of the first embodiment of the present invention. According to the first embodiment, the touch module 20 of the present invention includes a transparent substrate 21, a shield layer 22, a touch electrode layer 23, a transparent insulation layer 24 and a lead layer 25. The transparent substrate 21 has a first side 211 and a second side 212 opposite to the first side 211. In this embodiment, the transparent substrate 21 is made of a material, which is, but not limited to, glass for illustration purposes only. Alternatively, the material of the transparent substrate 10 can be selected from a group consisting of polyethylene terephthalate (PET), polycarbonate (PC), polyethylene (PE), polyvinyl chloride (PVC), polypropylene (PP), polystyrene (PS), polymethylmethacrylate (PMMA) and cyclo olefin copolymer (COC).

The shield layer 22 is coated on an edge of the second side 212 of the transparent substrate 21. A section of the transparent substrate 21 that is free from the shield layer 22 is defined as a touch section, while the edge coated with the shield layer 22 is defined as a non-touch section for providing concealing effect. In this embodiment, the shield layer 22 is made of such as a nontransparent insulation material by means of printing or spraying.

The touch electrode layer 23 is coated on the second side of the transparent substrate 21 and on the other side of the shield layer 22, which side is distal from the transparent substrate 21. The touch electrode layer 23 is partially coated on the shield layer 22 with an edge of the shield layer 22 free from the touch electrode layer 23. The touch electrode layer 23 is a coating made of a material selected from a group consisting of indium tin oxide (ITO), antimony tin oxide (ATO) and indium zinc oxide (IZO). In this embodiment, the touch electrode layer 23 is formed on the second side 212 by means of, but not limited to, sputtering deposition. In practice, the touch electrode layer 23 can be alternatively formed on the second side 212 by means of gelatinization, electroplating or evaporation.

The transparent insulation layer 24 is disposed on the other side of the touch electrode layer 23, which side is distal from the shield layer 22. The transparent insulation layer 24 covers the lateral edge of the touch electrode layer 23 and extends to the edge of the shield layer 22 that is free from the touch electrode layer 23. The transparent insulation layer 24 is formed with at least one through hole 241 on the touch electrode layer 23. In this embodiment, the transparent insulation layer 24 is made of such as a transparent or a nontransparent insulation material by means of printing or spraying and formed with the through hole 241 on the touch electrode layer 23.

The lead layer 25 is disposed on the other side of the transparent insulation layer 23, which side is distal from the touch electrode layer 23. The lead layer 25 is formed of a metal material such as silver paste, copper or molybdenum. In this embodiment, the lead layer 25 is formed of silver paste. In the case that silver paste is employed, the silver paste is printed onto the transparent insulation layer 24 to form the lead layer 25. In the case that other metal material is employed, the lead layer 25 can be formed by means of printing or photolithography process. When disposing the lead layer 25 onto the transparent insulation layer 24, the lead layer 25 is formed with a conduction section 251 positioned in the through hole 241 in electrical connection with the touch electrode layer 23. The conduction section 251 is formed of a metal material such as silver paste, copper or molybdenum. In this embodiment, the lead layer 25 and the conduction section 251 are formed of silver paste. Accordingly, the lead layer 25 can directly electrically connect with the touch electrode layer 23 through the through hole 241 of the transparent insulation layer 24. In this case, the cost for the optical mask design and the lithographic and etching processes can be saved. Moreover, the problem existing in the conventional touch panel that the first and second transparent substrates often fail to fully attach to each other is eliminated. Therefore, the ratio of defective products is lowered.

The touch module 20 further includes a conductive glue layer 26 disposed on the other side of the lead layer 25, which side is distal from the transparent insulation layer 24. The conductive glue layer 26 is an anisotropic conductive film (ACF) or an anisotropic conductive paste (ACP). A soft circuit board 27 is disposed on the other side of the conductive glue layer 26, which side is distal from the lead layer 25. The soft circuit board 27 is adhered to and electrically connected to the lead layer 25 via the conductive glue layer 26.

Figure 4:
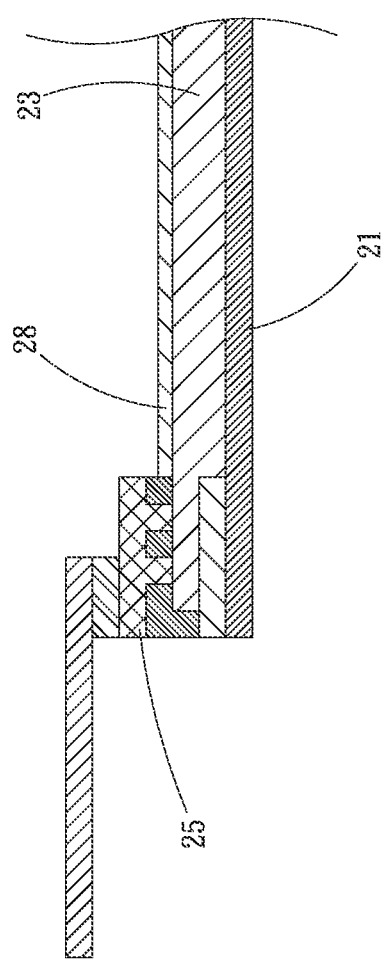
FIG. 4 is a sectional assembled view of a second embodiment of the present invention.

Please now refer to FIG. 4, which is a sectional assembled view of a second embodiment of the present invention. The second embodiment is substantially identical to the first embodiment in structure. The components of the second embodiment that identical to those of the first embodiment are denoted with the same reference numerals and will not be further described hereinafter. The second embodiment is different from the first embodiment in that a protection layer 28 is disposed on the other side of the touch electrode layer 23, which side is distal from the transparent substrate 21. The protection layer 28 is coated on the touch electrode layer 23 or coated on both the touch electrode layer 23 and the lead layer 25 (not shown in the drawing). In this embodiment, the protection layer 28 is coated on the touch electrode layer 23 to protect the touch electrode layer 23 from chemical corrosion or physical damage. The protection layer 28 is made of an inorganic material selected from a group consisting of silicon nitride, silicon oxide and silicon oxynitride. Alternatively, the protection layer 28 is made of an organic material such as acrylic resin or any other suitable material.

In conclusion, in comparison with the conventional touch panel, the present invention has the following advantages:
1. The manufacturing cost is lowered.
2. The ratio of good products is increased.

The present invention has been described with the above embodiments thereof and it is understood that many changes and modifications in the above embodiments can be carried out without departing from the scope and the spirit of the invention that is intended to be limited only by the appended claims.

What is claimed is:

1. A touch module comprising:
    a transparent substrate having a first side and a second side opposite to the first side;
    a shield layer coated on an edge of the second side of the transparent substrate;
    a touch electrode layer disposed on the second side of the transparent substrate and coated on a side of the shield layer, which side is distal from the transparent substrate;
    a transparent insulation layer coated on a side of the touch electrode layer, which side is distal from the shield layer, the transparent insulation layer being formed with at least one through hole on the touch electrode layer; and
    a lead layer coated on a side of the transparent insulation layer, which side is distal from the touch electrode layer, the lead layer being formed with a conduction section positioned in the through hole in electrical connection with the touch electrode layer;
    a conductive glue layer disposed on the other side of the lead layer, which side is distal from the transparent insulation layer; and
    a soft circuit board adhered to and electrically connected to the lead layer via the conductive glue layer.

2. The touch module as claimed in claim 1, wherein the transparent insulation layer covers a lateral edge of the touch electrode layer and extends to the shield layer.

3. The touch module as claimed in claim 1, wherein the touch electrode layer is formed on the second side of the transparent substrate by means of gelatinization, electroplating, evaporation or sputtering deposition and the touch electrode layer is a coating made of a material selected from a group consisting of indium tin oxide (ITO), antimony tin oxide (ATO) and indium zinc oxide (IZO).

4. The touch module as claimed in claim 1, wherein a protection layer is disposed on the other side of the touch electrode layer, which side is distal from the transparent substrate.

5. The touch module as claimed in claim 1, wherein the transparent substrate is made of a material selected from a group consisting of glass, polyethylene terephthalate (PET), polycarbonate (PC), polyethylene (PE), polyvinyl chloride (PVC), polypropylene (PP), polystyrene (PS), polymethylmethacrylate (PMMA) and cyclo olefin copolymer (COC).

* * * * *